Patented Aug. 11, 1936

2,050,640

UNITED STATES PATENT OFFICE 2,050,640

PROCESS FOR BREAKING EMULSIONS OF OIL AND WATER

Truman B. Wayne, Houston, Tex.

No Drawing. Original application July 7, 1930, Serial No. 466,360. Divided and this application November 20, 1934, Serial No. 753,991

13 Claims. (Cl. 196—4)

The present invention relates to an improved process for the breaking and resolving of emulsions of oil and water.

This application is a division of applicant's prior application Serial No. 466,360, filed July 7, 1930.

One of the objects of the invention is to resolve emulsions of the water-in-oil type by means of special reagents which, by their combined hydrotropic and penetrating qualities, as well as their ability to lower the surface tension between water and water-insoluble liquids, will rapidly resolve emulsions to which they have been added.

Another object of the invention is to break or resolve emulsions by subjecting the same to the action of organic substances which may broadly be defined as consisting of condensation products of alkyl and aryl nuclear substitution products of aromatic hydrocarbons and of their hydrogenated derivatives with organic bases.

A further object of the present invention is to cause the resolution of water-in-oil emulsions in which the water exists in the disperse phase in a continuous phase of oil, by means of substances of the group hereinabove mentioned, which by being soluble in the oil phase as well as in the water phase of the emulsion are capable of reaching the disperse water phase, and by their hydrotropic effect and their ability to change the surface tension phenomena between the disperse water phase and the continuous oil phase will cause an aggregation of the disperse water phase into a continuous water phase, which, under the influence of gravity, will bring about subsidence and stratification, whereby the emulsion becomes resolved into an individual water phase and a supernatant substantially water-free oil phase.

Other objects of the invention will appear from the detailed description and claims hereinbelow.

The emulsion-breaking reagents which I employ in carrying out my present invention are prepared from alkyl and aryl nuclear substitution products of aromatic hydrocarbons and their hydrogenated derivatives, for example, carbocyclic or heterocyclic compounds of fairly high molecular weight, such as naphthalene, anthracene, and their homologues and hydrogenated derivatives, and hydroxy compounds such as naphthol or similar cyclonuclear substances such as pyridine, quinoline, or their homologues, which are either alkylated, arylated, or cyclo-alkylated in the nucleus by condensation or treatment with sulphuric acid esters of the higher alcohols, the resultant products being then sulfonated. The said sulfonation may occur simultaneously with the reaction in which the nuclear substitution takes place. This may be done by subjecting the hydrocarbons themselves to substituting agents in the presence of powerful sulfonating and dehydrating agents such as oleum or chlorosulfonic acid.

Specific examples of suitable alcohols may be selected from the aliphatic series, preferably those containing three or more carbon atoms in the molecule, for instance, isopropyl, butyl, amyl, or hexyl alcohol. Polyhydric alcohols such as ethylene glycol are also suitable. An alcohol from the aromatic series such as hexahydrophenol, or an arylkyl alcohol such as benzyl alcohol, may likewise be substituted into the aromatic nucleus.

Other residues such as those from unsaturated higher fatty acids containing eight or more carbon atoms, for instance, oleic or ricinoleic acids, or from mono- or di-basic hydroxy acids such as glycolic or malic acids, respectively, may be introduced into the aromatic nucleus. Unsaturated dibasic acids such as maleic acid or keto acids such as aceto-acetic acid are also useful, particularly where the aromatic nucleus also contains an alkyl residue. It is, of course, contemplated that two or more different groups may be introduced into the same aromatic nucleus.

The sulfonic acids of the above mentioned aromatic hydrocarbons, substituted in their nuclei as described, are all highly soluble in water and possess very great wetting and penetrating qualities. They exert a very marked hydrotropic effect and lower the surface tension between water and water-insoluble liquids. However, under the conditions met in the commercial dehydration of petroleum emulsions, they are unable to penetrate the continuous oil phase and resolve the curvature existing at the oil-water interface as the result of action of the emulsifying colloid present at this point.

I have found that condensation products of these aromatic sulfonic acids with organic bases such as oil-soluble non-hydroxy alkylamines, or with aralkylamines characterized by having the amino group or its residue in the alkyl side-chain instead of attached directly to the aromatic nucleus, are highly effective demulsifiers for petroleum emulsions. Amines of the latter type are stronger bases than aralkylamines such as toluidine whose amino group is attached directly to the aromatic nucleus and hence resemble the more strongly basic aliphatic amines.

The term "hydrotropy," as used above, is one which is applied to substances which have the property of transforming certain materials normally insoluble in water into clear water solutions.

The sulfonic acids suitable for my purpose may be the mono-, di-, or tri-sulfonic acid of a cyclic aromatic hydrocarbon such as naphthalene or its hydrogenated, chlorinated, or other substituted form. Preferably the aromatic nucleus shall contain residues from alkyl, aralkyl, or cyclo-alkyl alcohols or other groups capable of being substituted into the aromatic nucleus. Many of the corresponding heterocyclic sulfonic acids may also be employed either alone or in admixture with sulfonic acids of the carboxylic series.

Suitable amines are the primary, secondary, and tertiary alkyl amines, preferably those whose alkyl groups contain three or more carbon atoms. These are characterized by their solubility in petroleum hydrocarbons. Some of the mono-alkyl amines are also soluble in water.

Condensation products prepared from the nuclear-substituted aromatic sulfonic acids and the non-hydroxy alkyl amines and also the aralkyl amines characterized by having the amino group or its residue in the alkyl side chain, are completely soluble in petroleum hydrocarbons after being freed from dissolved water, and many of them are also completely miscible with water, forming thick, colloidal solutions. These properties clearly distinguish these new condensation products from the ordinary water-soluble, oil-insoluble salts of the substituted aromatic sulfonic acids. They possess, also, the valuable property of being precipitated in colloidally hydrated form by brines and thus segregate at the oil-water interface in the most desirable form. The alkali metal or ammonium salts of these sulfonic acids do not possess the characteristics above mentioned, and their alkaline-earth salts either are crystalline or remain dissolved in the brine and thus do not segregate as hydrated colloids at the oil-water interface.

These new amino derivatives of aromatic sulfonic acids may be either the substituted ammonium salt or the acyl derivative. In the latter case, substitution of one or more hydrogens attached to the tertiary or quartenary nitrogen atom is involved. Some of the more complex di-, tri-, or tetra-amines may likewise be employed, and in this case a number of acyl residues may be attached to one molecule of amine.

For emulsions difficult to resolve, still more powerful emulsion-breaking reagents can be developed from the above mentioned nuclear substituted sulfonic acids, or their ammonium or sodium salts, by forming complex condensation products of the said substances with organic, hydroxy, keto or hydroxy-keto acids, the products being used either in connection with aliphatic or hydro-aromatic alcohols or ketones. Such condensation products show a still greater degree of wetting and hydrotropic effect.

While quite a number of these compounds may be prepared in known ways in accordance with the accepted synthetic methods of organic chemistry, it is to be understood, however, that any compound properly falling into the class of compounds claimed herein will be considered as an equivalent for the purpose of interpreting the following claims.

The reagents are employed in the proportion of from one part of the same to from two thousand to twenty thousand parts of the oil emulsions, the reagents being used either as such alone or in some carrier, as for example, water, oil, alcohol, tar-acid-oil or the like.

What it is desired to protect by Letters Patent and what I claim as my invention is:

1. The process of breaking water-in-oil emulsions which comprises the step of adding thereto the condensation product of a cyclic sulfonic acid and an aralkyl amine characterized by having its amino group in an alkyl side-chain, to effect separation of the component parts of oil and water.

2. The process of breaking water-in-oil emulsions which comprises the step of adding thereto the condensation product of a nuclear-substituted cyclic sulfonic acid and an aralkyl amine characterized by having its amino group in an alkyl side-chain, to effect separation of the component parts of oil and water.

3. The process of breaking water-in-oil emulsions which comprises the step of adding thereto the condensation product of a carbocyclic sulfonic acid and an aralkyl amine characterized by having its amino group in an alkyl side-chain, to effect separation of the component parts of oil and water.

4. The process of breaking water-in-oil emulsions which comprises the step of adding thereto the condensation product of a nuclear substituted carbocyclic sulfonic acid and an aralkyl amine characterized by having its amino group in an alkyl side-chain, to effect separation of the component parts of oil and water.

5. The process of breaking water-in-oil emulsions which comprises the step of adding thereto the condensation product of a heterocyclic sulfonic acid and an aralkyl amine characterized by having its amino group in an alkyl side-chain, to effect separation of the component parts of oil and water.

6. The process of breaking water-in-oil emulsions which comprises the step of adding thereto the condensation product of a nuclear-substituted heterocyclic sulfonic acid and an aralkyl amine characterized by having its amino group in an alkyl side-chain, to effect separation of the component parts of oil and water.

7. A composition for breaking water-in-oil emulsions which comprises as a component the condensation product of a cyclic sulfonic acid and an aralkyl amine characterized by having its amino group in an alkyl side-chain.

8. A composition for breaking water-in-oil emulsions which comprises as a component the condensation product of a nuclear-substituted cyclic sulfonic acid and an aralkyl amine characterized by having its amino group in an alkyl side-chain.

9. A composition for breaking water-in-oil emulsions which comprises as a component the condensation product of a carbocyclic sulfonic acid and an aralkyl amine characterized by having its amino group in an alkyl side-chain.

10. A composition for breaking water-in-oil emulsions which comprises as a component the condensation product of a nuclear substituted carbocyclic sulfonic acid and an aralkyl amine characterized by having its amino group in an alkyl side-chain.

11. A composition for breaking water-in-oil emulsions which comprises as a component the condensation product of a heterocyclic sulfonic acid and an aralkyl amine characterized by having its amino group in an alkyl side-chain.

12. A composition for breaking water-in-oil emulsions which comprises as a component the condensation product of a nuclear-substituted heterocyclic sulfonic acid and an aralkyl amine characterized by having its amino group in an alkyl side-chain.

13. A composition for breaking water-in-oil emulsions which comprises as a component the condensation product of a cyclic sulfonic acid selected from the group consisting of carbocyclic and heteroycyclic sulfonic acids which is substituted in the nucleus with one or more residues from the group comprising aliphatic, aromatic, or aralkyl radicals, and an aralkyl amine characterized by having its amino group in an alkyl side-chain.

TRUMAN B. WAYNE.